US005550646A

United States Patent [19]
Hassan et al.

[11] Patent Number: 5,550,646
[45] Date of Patent: Aug. 27, 1996

[54] IMAGE COMMUNICATION SYSTEM AND METHOD

[75] Inventors: Ahmad M. Hassan, Madison; Russel R. Johnston, Bedminster; John C. Krejci, Sparta, all of N.J.

[73] Assignee: Lucent Technologies Inc., Murray Hill, N.J.

[21] Appl. No.: 120,254

[22] Filed: Sep. 13, 1993

[51] Int. Cl.$^6$ ..................................................... H04N 1/32
[52] U.S. Cl. ........................ 358/442; 358/400; 379/100; 348/18
[58] Field of Search ..................... 358/400, 440, 358/468, 442, 909.1, 456, 457; 379/96–98, 100; 348/14, 17, 18; 370/94.1, 94.2, 95.1; H04N 1/00, 1/32

[56] References Cited

U.S. PATENT DOCUMENTS

| | | | |
|---|---|---|---|
| 3,953,668 | 4/1976 | Judice | 348/910 |
| 4,587,633 | 5/1986 | Wang et al. | 379/96 |
| 4,614,977 | 9/1986 | Kawasaki et al. | 358/260 |
| 4,646,160 | 2/1987 | Iizuka et al. | 358/402 |
| 4,811,239 | 3/1989 | Tsao et al. | 364/519 |
| 4,827,085 | 5/1989 | Yaniv et al. | 178/18 |
| 5,020,096 | 5/1991 | Sakakibara et al. | 379/96 |
| 5,036,390 | 7/1991 | Masunaga | 348/14 |
| 5,086,455 | 2/1992 | Satomi et al. | 379/100 |
| 5,136,628 | 8/1992 | Araki et al. | 348/18 |
| 5,182,635 | 1/1993 | Nakashima et al. | 348/17 |
| 5,237,429 | 8/1993 | Zuiss et al. | 379/100 |
| 5,263,025 | 11/1993 | Torri et al. | |

OTHER PUBLICATIONS

Table of Contents—Electronic Imaging 88—International Electronic Imaging Exposition & Conference, Oct. 1988.
H. Farhangi et al. "A Microprocessor–Based Still Frame Capturing System" Displays, Oct. 1982, pp. 212–217.

A. Mathur et al. "Image Management Software for Decompressions, Scaling and Display of Digitized Images", Electronic Imaging 88—International Electronic Imaging Exposition & Conference, Oct. 1988. pp. 1208–1213.

M. Rabbani et al. "An Optimized Image Data Compression Technique Utilized in the Kodak SV9600 Still Video Transceiver", Proceedings of the SPIE—The International Society for Optical Engineering, vol. 1071, 1989, pp. 246–256.

L. P. Glidewell "Filmless Camera Technology Boosts Image Transmission", Defense Electronics, Jun. 1989, pp. 105–112.

*Primary Examiner*—Kim Yen Vu
*Attorney, Agent, or Firm*—Barry H. Freedman; Mark K. Young

[57] ABSTRACT

An image communication system and method includes an image capture device which utilizes CCD technology to "take a picture", i.e., to capture an image, and then to generate a digital representation of that image which may be applied to a fax modem and then transmitted to a remote facsimile machine via a telephone communication link. The digital image is processed, such as by dithering, to enhance its presentability, so that shades of gray present in a conventional black and white photograph are converted to a pattern of black and white dots which retains the character of the original image in spite of subsequent facsimile transmission. The image capture device may include a printer and a memory for storing multiple images as well as the destination numbers of facsimile machines which are intended to receive copies of the images.

7 Claims, 4 Drawing Sheets

5,550,646

IMAGE COMMUNICATION SYSTEM AND METHOD

FIELD OF THE INVENTION

This invention relates generally to communication of images, and, in particular to transmission of image information to a facsimile receiver.

BACKGROUND OF THE INVENTION

Visual communications systems and techniques, in which images are captured and transmitted via the telecommunications network, have recently become increasingly significant. For example, AT&T has recently introduced its Video-Phone 2000, which attaches to ordinary telephone lines. A real time moving image of the persons using the system is transmitted, along with the verbal conversation. However, the VideoPhone and similar systems are not portable, and must be used either in a fixed location, or in any event near a location in which a connection to the telephone network is available. Also, such systems are relatively expensive.

Another entry in this market, also available from AT&T, is the Picasso still image phone, which is used in conjunction with a conventional video camera and a television receiver. At the transmitting end, a still image from the video camera is captured in the Picasso phone, and then transmitted to the remote Picasso phone, where it is stored and then displayed on a television receiver. This arrangement too is neither portable nor inexpensive.

Yet other image capture and display products are called digital cameras or instant electronic cameras, such as are described in U.S. Pat. No. 4,074,324 issued to J. S. Barrett on Feb. 14, 1978. Commercially available digital cameras include the Model 3 available from DYCAM and the Fotoman Plus available from Logitech. With a digital camera, an image is scanned by an internal charge coupled device (CCD), digitized and stored inside the camera. A personal computer is then needed to view, manipulate and store the image. These digital cameras are designed as computer peripherals, specifically, as input devices for computer based applications. No provision is made in digital cameras for remote display of the images.

SUMMARY OF THE INVENTION

In accordance with our invention, an image communication system and method includes an image capture device which utilizes CCD technology to "take a picture", i.e., to capture an image, and then to generate a digital representation of that image that can be transmitted via a telephone communication link to a remote facsimile machine. The digital image is advantageously processed to enhance its presentability, and stored. The enhancement of the digital image essentially converts the shades of gray present in a conventional black and white photograph to a pattern of black and white dots (sometimes called picture elements or pels) which retains the character of the original image in spite of subsubsequent facsimile transmission and possible photocoping that may thereafter occur. This assures that the image can be displayed on an output device, such as a facsimile machine that is capable of producing only an essentially black and white bit mapped image. The image capture device may include a miniature printer, but is nevertheless compact and lightweight, so that the device can be easily transported to a location at which a connection to the telephone network is available.

In one embodiment, the image capture device is arranged so that it may be connected directly to a standard telephone line, for example, by using a conventional RJ11 jack and plug. Alternatively, the image capture device may be connected to or include a built in cellular telephone. In either event, the user may establish the communications connection to a remote facsimile machine by entering the destination number(s) of one or more facsimile machines which are intended to receive copies of the image into a keypad, or retreiving the destination number from a memory in the image capture device. The stored image is then applied to a fax modem disposed within the image capture device, which converts the stored information to an appropriate format, and then dials the number of the remote facsimile machine to establish the required communications connection(s) for transmission of the facsimile image.

BRIEF DESCRIPTION OF THE DRAWING

The present invention will be more fully appreciated by consideration of the following detailed description, which should be read in light of the accompanying drawing in which.

DETAILED DESCRIPTION

Figure 1:
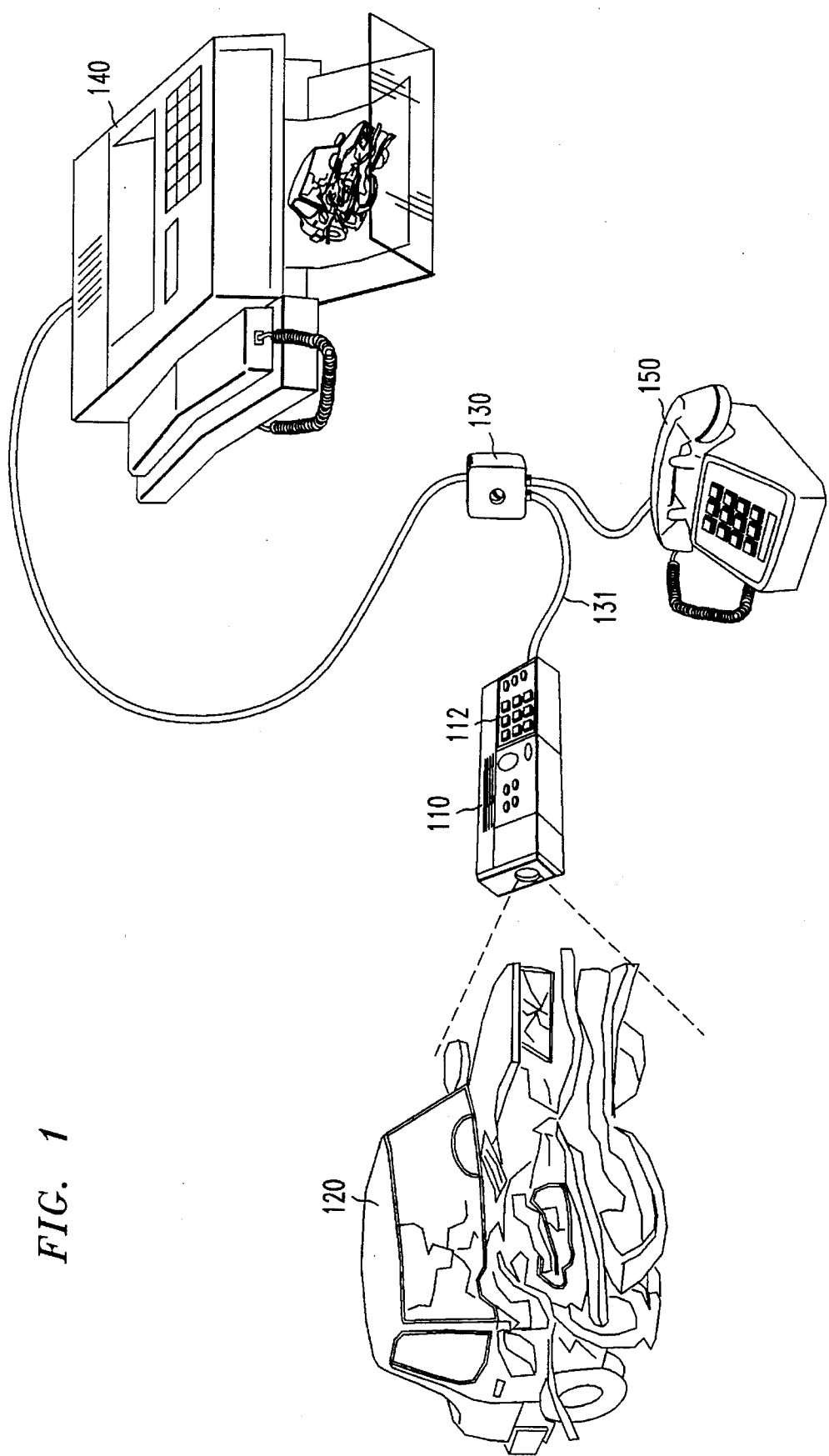
FIG. 1 is a schematic diagram illustrating an image capture device arranged in accordance with the present invention, and its use in a system to enable communication of a captured image to a remote facsimile machine.

Referring first to FIG. 1, there is shown a schematic diagram illustrating an image capture device arranged in accordance with the present invention, and its use in a system to enable communication of a captured image to a remote facsimile machine. The image capture device is designated generally as 110, and in appearance resembles a small, portable, hand held camera. Image capture device 110 is arranged, as described in more detail below, to "take a picture", such as a picture of damaged automobile 120, and to store a digital representation (image) of the picture in an internal memory. The image remains in the memory until the image capture device can be connected or gain access to a telecommunications network, such as by being connected to an ordinary telephone jack 130 by a telephone line 131, or being connected to a cellular telephone arranged to establish an over the air communications link. A communications connection can then be established between image capture device 110 and a remote facsimile machine 140, such as by keying the number of facsimile machine 140 on a keypad 112 built into image capture device 110. Alternatively, as shown in FIG. 1, dialing may be accomplished using telephone 150 which is connected to the same jack 130 and bridged on the telephone line. When the connection is made, a "send" button on the image capture device is activated, causing the stored digital representation to be applied to a fax modem in the device. The image, in this case, of the damaged automobile, is thus transmitted to and displayed on the remote facsimile machine. Advantageously, the image capture device also includes a printing capability, such as may be provided by a miniature thermal printer, so that a hard copy of a stored image may be generated and reviewed. This is helpful in previewing the image that is to be transmitted to a remote facsimile machine.

Dialing can be accomplished in an alternative arrangement, such as by first storing a sequence of digits representing the dialed number in a memory within the image capture device, and by thereafter reading out and applying the digits to a dialing circuit at the time the connection is established.

The advantages of the present invention are that the image capture device is small, portable and inexpensive. It can be connected to the telephone network anywhere an ordinary telephone jack is available, or, if provided with a cellular telephone capability or connection, anywhere cellular service is available, and a picture stored in the camera can be transmitted to any conventional facsimile machine in near real time. The invention thus would be of great value to architects, landscapers, designers, artists, engineers, insurance adjusters, auto repairmen, teachers, doctors, advertising agencies, marketing departments, etc.

Figure 2:
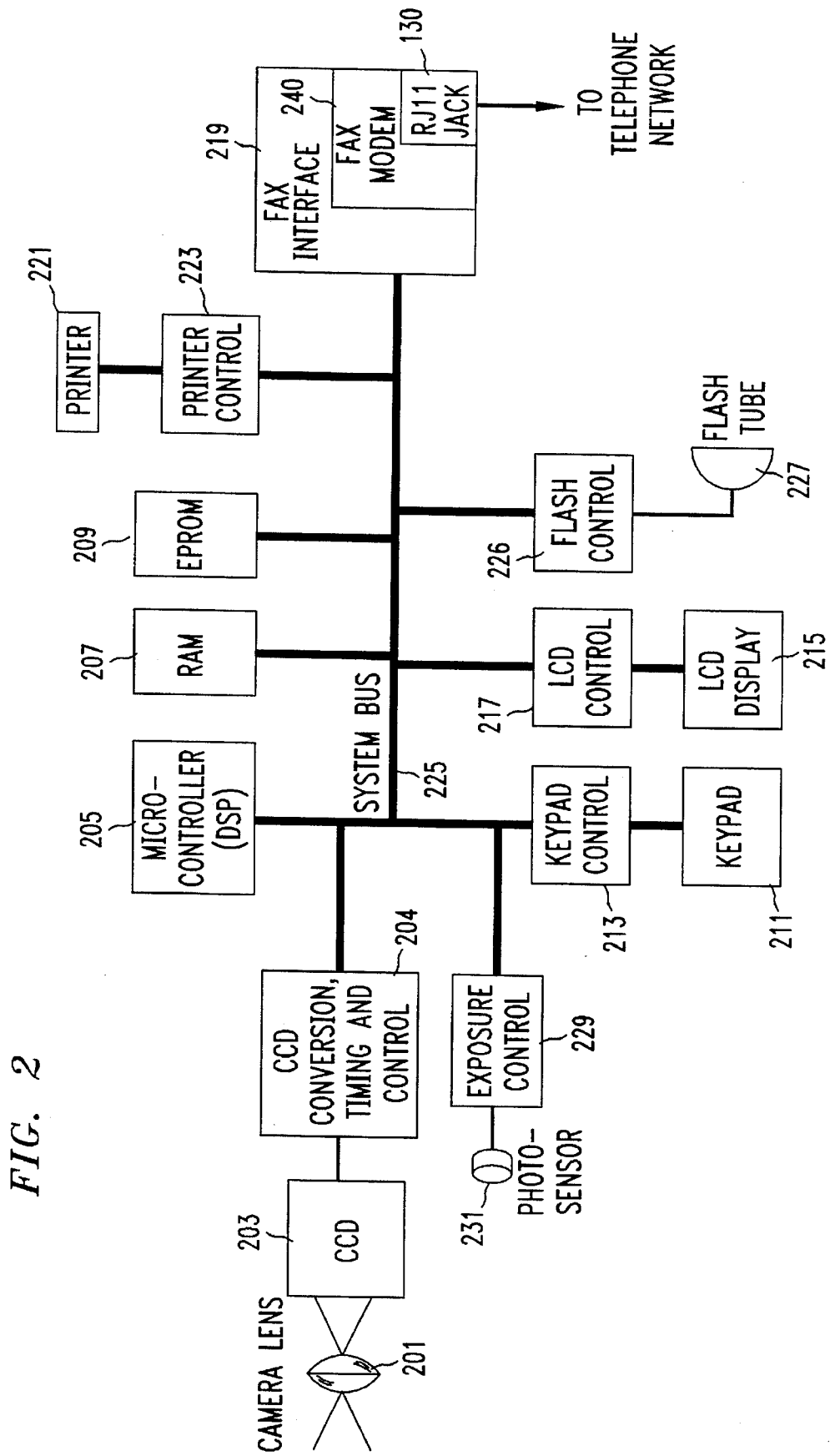
FIG. 2 is a block diagram of image capture device 110 of FIG. 1.

Referring now to FIG. 2, there is shown a block diagram of image capture device 110 of FIG. 1. A picture is taken by the device by focusing light collected by a lens assembly 201 on a charge coupled device (CCD) 203, which has an associated control element 204 that operates in response to commands issued by a microcontroller 205 and communicated to CCD 203 via a system bus 225. Microcontroller 205 may be implemented in a digital signal processor (DSP) chip, such as the 3210 chip available from AT&T, which preferably includes an internal clock function. The combination of lens assembly 201, CCD 203 and control element 204 are well known to those skilled in the art, and can be found in digital cameras such as those made by Dycam. Well known functionality in such arrangements includes automatic focusing of the image provided by lens assembly 201. As an alternative to automatic focusing, and to save cost, lens assembly 201 may be arranged with a large focal depth. Automatic aperture/exposure control may be provided using photo sensor 231, which is arranged to measure the lighting conditions relative to the image being captured, and provide a signal to exposure control circuit 229 which is connected to system bus 225. In cases where the ambient lighting conditions are inadequate, a signal may be sent to flash control circuit 226 to actuate a built-in flash tube 227. In addition, automatic color balance and other camera features may be provided.

The image output from CCD 203 is processed in microcontroller 205 to enhance presentability, illustratively by dithering, and then stored, in compressed digital form, in a random access memory (RAM) 207. Compression may be achieved using any well known compression/archiving algorithm, which is later reversed by corresponding decompression when the image is later printed or transmitted to a remote facsimile machine. The purpose of the dithering (or other enhancement) is to enable the picture to be displayed on a facsimile machine that is essentially limited to displaying black and white bit mapped pictures, rather than grey scale images. This can be explained as follows: The image captured by CCD 203 is generally about 640 by about 480 pixels, each having 16 possible grey levels. This image may be dithered to around 1500 by 1000 black and white pixels, such that each original pixel is represented by a two by two block of pixels, which may have sixteen different black and white patterns. If the dithered image is transmitted to a fax machine which reproduces 200 pixels (dots) per inch, an image of approximately 7.5 inches by 5 inches can be produced, when displayed sideways on a page.

Keypad 211 is provided in image capture device so that a user can input commands and other information into the device, and the commands can be passed to microcontroller 205 via a keypad control circuit 213 and system bus 225. Advantageously, keypad 211 and keypad control circuit 213 are arranged to implement a command set that includes various commands that initiate the taking of a picture (i.e., shutter control), storing a picture in memory, printing a picture, deleting a picture from memory, and initiation of transmission of one or more pictures to a remote facsimile machine. The information that can be input via keypad 211 includes the telephone numbers of one or more facsimile machines with which the device can communicate, and other operating instructions and parameters associated with facsimiles, such as a designation of the point of origination, the resolution of the display, and so on. The keypad can be fabricated from a well known rubber mat disposed on PCB switches.

LCD display 215, and its associated LCD control circuit 217, are included in the image capture device to provide the user with a visual indication of the operating modes and status of the device. Specific alphanumerics shown on LCD display 215 are determined by signals generated by microcontroller 205. Typical information that may be displayed include the image number of the image being captured, which corresponds to the "film counter" function of a conventional camera, the current time and date, the number of images already stored (and the date and time they were stored), the image number of the image being recalled from RAM 207 and transmitted to a remote facsimile machine, and so on.

RAM 207, which is used for storing images captured by the image capture device, should have a capacity of approximately 4 MBytes, so that approximately 20 images can be stored. 4 MBytes will be sufficient, since each image requires approximately 640×480 / 2=153600 bytes. Advantageously, the image capture device is arranged so that the date and time an image is captured in taken from an internal clock in microcontroller 205 and stored together with the image itself. This enables convenient image retrieval, for example, based upon the sequence in which images were captured.

An EPROM 209 is used to store programs used in microcontroller 205, that control the overall operation of the image capture device, and specific functions performed. Specifically, EPROM 209 may store dithering and/or compression algorithms used to process and/or compress the digital image prior to storage in RAM 207. Also, EPROM 209 controls the "prompts" that may be displayed on LCD display 215 when various functions are activated. For example, when an image is captured, the user of the system may be prompted to enter a supplemental ID number or other text information by displaying a legend on LCD display 215 that reads "enter ID on keypad". This supplemental ID or relevant notes would be entered by a user via alphanumeric keypad 211, and stored with the digital image in RAM 207. The supplemental ID or notes could later be recalled and displayed on LCD display 215, so that a user could be reminded of important facts (such as client name, file number, etc.) associated with a particular digital image. In a similar fashion, a camera identification number may be entered to identify the camera when a fax is sent or image printed. EPROM 209 may be implemented using commercially available CMOS devices.

A facsimile interface 219 is provided in the image capture device in order to prepare an enhanced digital image for transmission to a remote facsimile machine. Facsimile interface 219 includes a fax modem 240 and associated control electronics, which may be arranged to send the bit map image using standard FAX protocol, Group 3, with normal FAX transmission hand shaking. The output of fax modem 240 is applied to the telephone network via a physical connection through jack 130, which, as stated previously, may be a conventional RJ11 jack. Alternatively, the output of fax modem 240 may be applied as an input to the transmitter section of a cellular telephone.

Local printing is accomplished in the image capture device by a printer 221 which, as stated previously, may be a miniature thermal printer, a dot matrix printer, or another type of printing device. Printer 221 may also print and output messages indicating the status of facsimile transmissions, such as confirmation that a message was successfully received, or error messages. The microcontroller 205 may provide suitable conversion between the digital image format used when images are applied to system bus 225 after being retrieved from RAM 207, the format of text messages, and the format used in printer 221. The associated printer control circuit 223 provides line feed and other basic mechanism control functionalities over printer 221.

Power for the elements of image capture device 110 is provided from a battery, preferably rechargeable, which is not shown in FIG. 2.

Figure 3:
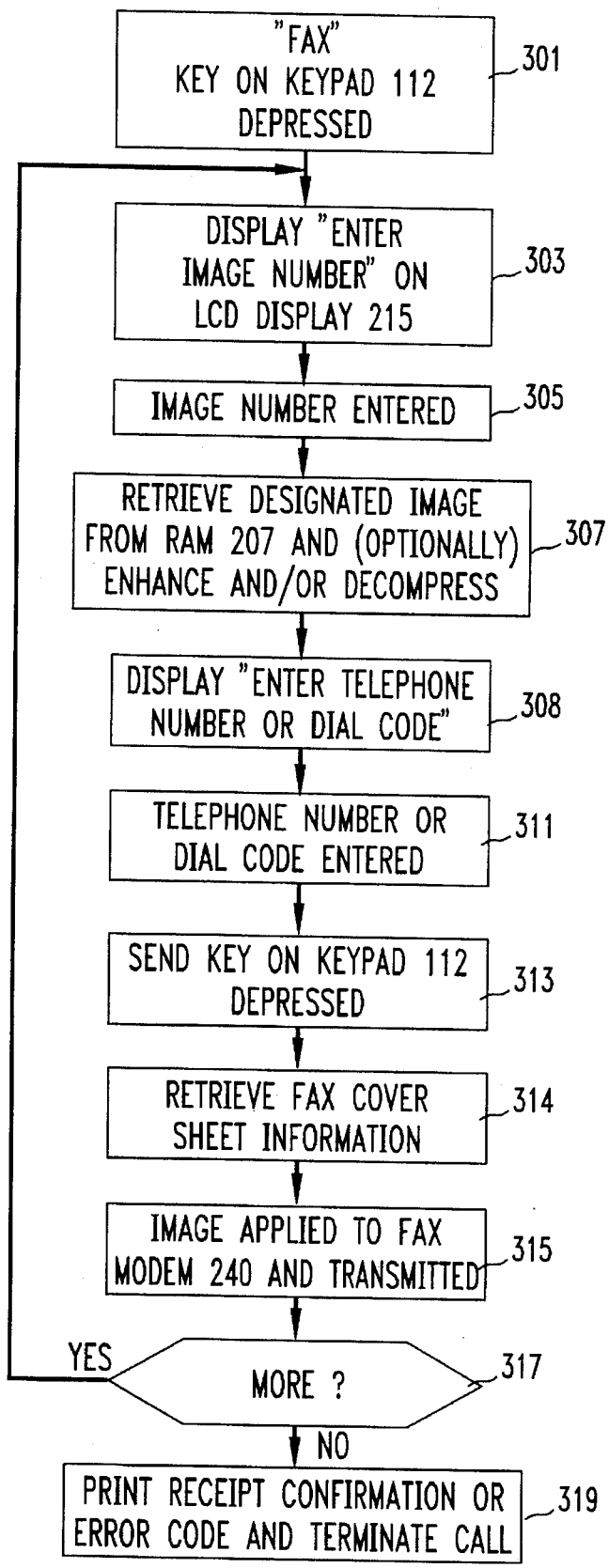
FIG. 3 is a flow diagram illustrating the steps performed by the system of FIG. 1 when a captured image is to be transmitted to a remote facsimile machine.

Referring now to FIG. 3, there is shown a flow diagram illustrating the steps performed by the system of FIG. 1 when a captured image is to be transmitted to a remote facsimile machine. The process is initiated in step 301, when a user depresses a "FAX" key, being a designated command represented by one of the keys (or a combination of keys) on keypad 211. The fax transmission command is recognized in microcontroller 205, and the fax transmission "program" is retrieved from EPROM 209. In step 303, information is supplied to LCD control circuit 217, generating a display on LCD display 215 requesting the user to "ENTER IMAGE NUMBER", i.e., the identification of a particular image stored in RAM 207. When a particular stored image is identified by one or more entries on keypad 211 in step 305, the designated image is retrieved from RAM 207 and converted by microcontroller 205, in step 307, illustratively from compressed storage format to group III fax format, as described above. At this time, the image may be processed to enhance its presentability, such as by dithering, if dithering was not performed previously when the image was captured and stored.

Next, in step 309, the user is prompted for the telephone number of the remote facsimile machine, by display of a suitable legend on LCD display 215. The telephone number may be manually entered in step 311, by use of keypad 211. Alternatively, a particular prestored telephone number may be indicated by entry of an associated dial code in step 311. In the latter event, microcontroller 205 would be arranged to retrieve the associated number from RAM 207 in response to receipt of the code. Once the number is entered, a "SEND" key on keypad 211 is actuated in step 313, causing a facsimile cover sheet to be retrieved in step 314 and both the cover sheet and the stored image to be applied to fax modem 240 in facsimile interface 219, in step 315. Modem 240 converts the image to standard facsimile format, and applies the output signal, including conventional modem control signals, to the communications channel, such as telephone line 131 via jack 130, which serves as the physical interface.

Note here that the fax cover sheet retrieved in step 314 can be automatically generated in accordance with our invention by storing certain information for the cover sheet in RAM 207. The stored information is then augmented by the current date and time obtained from the clock in microcontroller 205, as well as the stored date and time (indicating when the image was captured) and supplemental ID number associated with the digital image being transmitted, if previously provided by the user. A camera identification number, which is provided by the user and stored in RAM 207, may also be included in the cover sheet.

After transmission of a stored image is complete, the user is prompted in step 317 to determine if other images are to be transmitted. If a positive response is entered via keypad 112, the process of FIG. 3 is repeated, beginning with step 303. If a negative response is entered, of if no response in entered within a predetermined time period, the process is completed in step 319, wherein information indicating confirmation of receipt of the facsimile is received in fax modem 240 from the remote fax machine, or if an error condition is reported, that information is received. Such information may be stored temporarily in RAM 207, and then printed on printer 221 in step 319.

Figure 4:
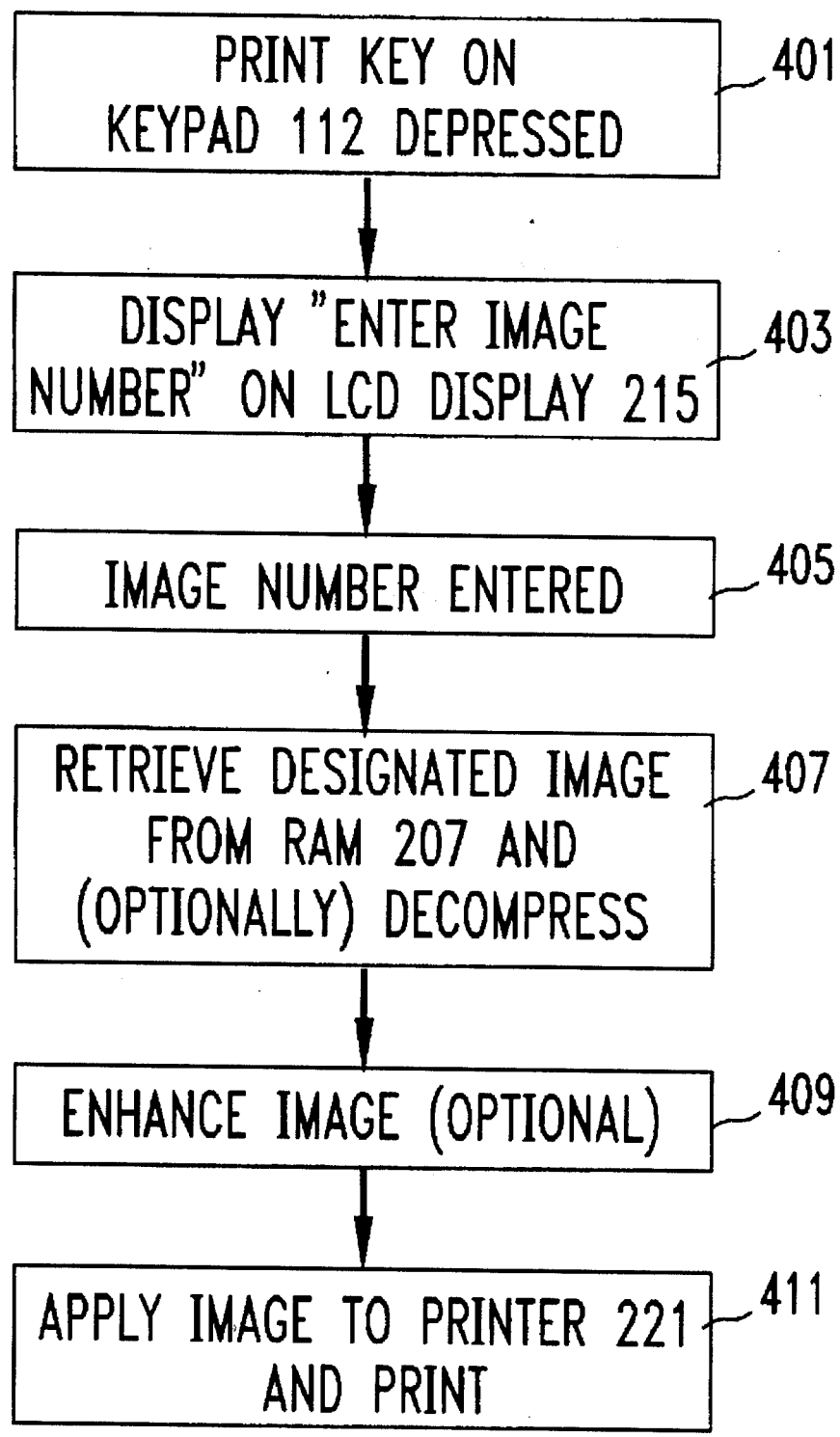
FIG. 4 is a flow diagram illustrating the steps performed by the system of FIG. 1 when a captured image is to be printed locally.

FIG. 4 is a flow diagram illustrating the steps performed by the system of FIG. 1 when a captured image is to be printed locally. The beginning portion of the process, which is similar to the beginning portion of the process of FIG. 3, is initiated in step 401, when a user depresses a "PRINT" key, being a designated command represented by one of the keys (or a combination of keys) on keypad 112. The print command is recognized in microcontroller 205, and the print "program" is retrieved from EPROM 209. In step 403, information is supplied to LCD control circuit 217, generating a display on LCD display 215 requesting the user to "ENTER IMAGE NUMBER", i.e., the identification of a particular image stored in RAM 207. When a particular stored image is identified by one or more entries on keypad 211 in step 405, the designated image is retrieved from RAM 207 and converted by microcontroller 205, in step 407, from compressed storage format to appropriate printer format, illustratively bit mapped graphics. At this time, the image may be processed in step 409 to enhance its presentability. Finally, in step 411, the image is applied to printer control circuit 223 and printer 221 for local printing.

Various changes and modifications may be made in the invention by those of ordinary skill in the art. Thus, it is intended that the invention be limited only by the appended claims. For example, the use of compression in the storage of an image in RAM 207 and the later decompression before printing or transmission to a remote facsimile machine, is entirely optional, and compression can be dispensed with in order to save either processing time or cost. In addition, dithering (or other image processing) can be performed at the time that the image is retrieved for printing or transmission, rather than at the time that the image is stored in RAM 207. This alternate arrangement would be used when time delay in retrieval is not an important factor, since, in this arrangement, images could be captured and stored in RAM 207 more quickly. As a yet further alternative, the image capture device can include additional "temporary" memory, to facilitate the capture of several images in a short time period. Each captured image is stored in the temporary memory in real time, and, at a later time, dithered (and optionally compressed) and stored in RAM 207. Note also that while black and white facsimiles have been described above, the present invention could easily be extended to color facsimile processing. In such implementations, the conversion of a color image captured by the image capture device to a representation of the image that could be transmitted to a color facsimile would be arranged to comply with established standards and protocols.

We claim:

1. An image communication system comprising a portable image capture device including means arranged to generate digital representations of images;

means for processing said digital representations so that shades of gray present in said images are converted to patterns of black and white dots;

memory means for storing destination numbers of facsimile machines which are intended to receive copies of said images;

a Group III compatible fax modem; and means for supplying one of said stored destination numbers and one of said processed digital representations to said fax modem, so that said image may be transmitted to a remote Group III compatible facsimile machine.

2. The invention defined in claim 1 wherein said image communication system further includes a printer arranged to print a copy of said processed digital representations.

3. The invention defined in claim 1 wherein said memory means is arranged to store multiple images.

4. The invention of claim 1 wherein said portable image capture device includes a CCD camera.

5. An image communication method comprising the steps of generating a digital representation of an image in a portable image capture device;

processing said digital representation so that shades of gray present in said image are converted to a pattern of black and white dots;

storing said digital representation as well as destination numbers of Group III compatible facsimile machines which are intended to receive copies of said images in a memory in said portable device; and supplying one of said stored destination numbers and one of said processed digital representations to a Group III compatible fax modem in said portable device, so that said image may be transmitted from said portable device to one or more remotely located ones of said facsimile machines.

6. The method defined in claim 5 wherein said method further includes the step of storing multiple images in said memory.

7. The invention of claim 5 wherein said portable image capture device includes a CCD camera.

* * * * *